United States Patent
Kim

(10) Patent No.: US 6,244,404 B1
(45) Date of Patent: Jun. 12, 2001

(54) SYNCHRONIZER FOR MANUAL TRANSMISSION AND A METHOD THEREOF

(75) Inventor: Myung-Hun Kim, Kyungki-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/432,088

(22) Filed: Nov. 2, 1999

(30) Foreign Application Priority Data

Jun. 21, 1999 (KR) .................................................. 99-23235

(51) Int. Cl.$^7$ ....................................................... F16H 3/38
(52) U.S. Cl. ........................ 192/53.34; 74/339; 192/53.32
(58) Field of Search ............................ 192/48.91, 53.34, 192/53.341, 53.32; 74/339

(56) References Cited

U.S. PATENT DOCUMENTS

| | | | |
|---|---|---|---|
| 4,526,052 | * 7/1985 | Hiraiwa | 192/53.34 X |
| 4,830,159 | * 5/1989 | Johnson et al. | 192/53.34 X |
| 5,678,670 | * 10/1997 | Olsson | 192/53.34 X |
| 5,695,033 | * 12/1997 | Hiraiwa | 192/53.34 X |

\* cited by examiner

Primary Examiner—Charles A. Marmor
Assistant Examiner—Saúl Rodriguez
(74) Attorney, Agent, or Firm—Birch, Stewart, Kolasch & Birch, LLP

(57) ABSTRACT

A synchronizer for a manual transmission comprises a clutch hub rotated along with an input shaft, a clutch sleeve assembled for performing rotation with the clutch hub to move toward the input shaft and a synchronizer ring formed for meshing with the clutch sleeve when the clutch sleeve moves to be synchronized with driving gears by friction, synchro-lever formed with an upper portion thereof closely attached to a groove of the clutch sleeve and a lower portion thereof positioned at the lateral surface of the clutch hub when its portion is accommodated into a key slot of the clutch hub to thereby occur a synchronizing operation with the driving gear by pushing the synchronizing ring positioned at one side thereof when tilted clockwise or counter-clockwise by being caught on the clutch hub in moving toward the input shaft, and an accommodating part formed as a space among the clutch hub, the synchronizer ring and the driving gear for letting the synchro-lever rotate at a predetermined angle to get a portion thereof in contact with the synchronizer ring, thereby simplifying the structure of the synchronizer to improve efficiency of assembling tasks and improving the changing-speed feeling for forward and backward changing-speed operations.

7 Claims, 8 Drawing Sheets

SYNCHRONIZER FOR MANUAL TRANSMISSION AND A METHOD THEREOF

BACKGROUND OF THE INVENTION

1. Field of the Invention

The present invention relates to a synchronizer for manual transmission and a method thereof, and more particularly to a simplified synchronizer for a manual transmission with an improved changing-speed feeling in forward and reverse changing-speed operations.

2. Description of Prior Art

In general, a manual transmission of an automobile changes power generated from an engine into proper driving force and outputs it in accordance with changes in driving states of the automobile, which provides an optimum driving capability.

As shown in FIGS. 7 and 8, the manual transmission comprises a plurality of levels of driving gears (first, second, third, fourth, fifth and backward) 50 assembled and idled at input shaft I, a synchronizer 51 disposed among the driving gears 50 for rotating along with the input shaft I to transmit/block power to the driving gears 50 in response to operation by shifting levers (not shown) and a plurality of driven gears 52 fixed at the output axis and meshed with the driving gears 50.

In order to manipulate the synchronizer 51 with the shifting levers, a plurality of shifting rails (R) are assembled with a plurality of shifting forks (P) fixed thereon. In order to transmit power conveyed by the differential gear (D) of an output axis (O) to wheels at both sides, a differential unit (DF) is coupled therewith.

The synchronizer 51 is constructed to synchronize the rotational speed of the input shaft I and the driving gears 50 with a braking torque by steps to smoothly change speeds. In order to simplify the structure of the synchronizer, a separate reverse synchronizer is not prepared. Instead, only a device is used for simply stopping the input shaft I and then for accomplishing the reverse changing speed.

As shown in FIG. 9, the aforementioned synchronizer is constructed with a clutch hub 54 coupled with the input shaft I for rotation and a plurality of key slots 53 formed at the periphery thereof, an synchro-key 56 inserted at the key slots 53 with its internal surface being supported by a synchronizing spring 55 to be loaded for extending outside, a clutch sleeve 58 coupled at the outer surface of the clutch hub 54 with a sleeve gear 57 assembled at the lower side thereof for enabling to slide toward the input shaft and to rotate with the synchro-key 56 being closely attached to the internal surface thereof, a synchronizer ring 61 positioned at the lateral surface of the clutch sleeve 58 with a first frictional surface 59 of a cone shape formed at the internal peripheral surface thereof for accomplishing synchronization by being pushed by the synchro-key 56 and a synchro-gear 60 for coupling the sleeve gear 57, and shifting gears 63 extensively formed at the driving gears 50 with a second frictional surface 62 to rub with the first frictional surface 59 by steps.

Particularly, a predetermined size of a protruder 64 and a groove 65 are formed at the position where the synchro-key 56 and the clutch sleeve 58 contact with each other for pushing the synchronizer ring 61 if less than a predetermined level of force is applied, or for letting the clutch sleeve 58 climb over the synchro-key 56 if more than a predetermined level of force is applied.

In addition, in order to perform the reverse changing-speed operations, there are provided a brake ring 68 disposed at one side of the clutch sleeve 58 for being pushed by the shynchro-key 56 and has a third frictional surface 66 formed at its internal peripheral surface and a brake gear 67 for meshing with the sleeve gear 57, a ring-shaped reverse cone part 70 fixedly on mounted a transmission case C and formed with a fourth frictional surface 69 for being rubbed with the third frictional surface 66 by steps when the brake ring 68 is pushed.

A wave spring 71 is assembled between the transmission case and the brake ring 68 for pushing the brake ring 68 to be apart from the reverse cone part 70 after completion of the reverse changing-speed operation.

At this time, when the clutch sleeve 58 is moved to a direction R, a reverse changing-speed lever 72 and a reverse shifting gear 73 shown in FIG. 8 move to mesh with a reverse gear tooth 74 formed at the first/second clutch sleeve 58', referred to as symbol RG in FIG. 7, and a reverse driving gear 75 fixed at the input shaft I. Then, the reverse changing-speed operation is completed.

Now, the operations of the synchronizer will be described. If the shifting lever is manipulated, for instance, to carry out the shifting operation to the fifth level, the clutch sleeve 58 is moved to the right in the drawing.

If the clutch sleeve 58 is moved to the right, the synchro-key 56 tightly attached to the internal peripheral surface of the clutch hub 54 at a predetermined level of force moves to push the synchronizer ring 61. At this time, the first and second frictional surfaces 59, 62 are rubbed to start synchronizing the rotational speed of the clutch sleeve 58 and the driving gear 50.

If the rotational speed of the clutch sleeve 58 and the driving gear 50 gets synchronized, the clutch sleeve 58 climbs over the protruder 64 of the synchro-key 56 to be meshed with the shychro-gear 60 of the synchronizer ring 61 and then passes through it to be meshed with the shifting gear 63 of the driving gear 50. When the clutch sleeve 58 and the shifting gear 63 of the driving gears 50 are meshed, a changing-speed operation is completed.

At this time, procedures of the reverse changing-speed operation will be described. If the shifting lever is put to the reverse driving position, the clutch sleeve 58 moves to the direction R as indicated in the drawing (to the left in the drawing).

If the clutch sleeve 58 moves to the direction R, the synchro-key 56 pushes the brake ring 68 to get rubbed the third and fourth frictional surfaces 66, 69 respectively formed at the brake ring 68 and at the reverse cone part 70, thereby reducing the rotational speed of the clutch sleeve 58, that is, the input shaft I.

If the rotational speed of the clutch sleeve 58 reduces, the clutch sleeve 58 meshes with the brake gear 67 of the brake ring 68 to press down the wave spring 71.

At this time, while the reverse changing-speed lever 72 shown in FIG. 8 moves along with the clutch sleeve 58, the reverse gear 73 interlocked at the reverse changing-speed lever 72 moves to be meshed between the reverse gear tooth 74 of the first/second clutch sleeve 58' and the reverse driving gear 75 as shown in FIG. 10.

If the reverse changing-speed operation is completed as described above, the force that pushes the brake ring 68 is exhausted to get the brake ring 68 apart from the reverse cone part 70 due to elasticity of the wave spring 71, thereby being able to reversely drive.

The synchronizer of the manual transmission described above comprises, in order to synchronize the driving gear and the clutch sleeve, the shynchro-key which slides to the axis from the clutch hub, the clutch sleeve which moves the synchro-key at a predetermined level of force to synchronize the synchronizer ring and the driving gear and is meshed with the shifting gear of the driving gear at more than a predetermined level of force, and the synchronizer spring which supports the synchro-key. However, there is a problem in the conventional synchronizer in that the structure thereof is complicated and the assembling capability of the synchro-key and others are poor, thereby increasing manufacturing cost and lowering assembling efficiency.

In addition, in order for the clutch sleeve to push the synchronizer ring at a predetermined level of force to be meshed with the shifting gear of the driving gear, the protruder and groove should be provided between the shynchro-key and the clutch sleeve. Therefore, there is another problem in the conventional synchronizer in that, when the clutch sleeve climbs over the protruder and groove during changing-speed operations, the changing-speed feeling declines.

Particularly, there is another problem in the conventional synchronizer in that, when the clutch sleeve and the brake ring are operated during reverse changing-speed procedure, the force, larger than elasticity of the wave spring, should be applied, thereby needing larger manipulating strength to cause inconveniences in performing changing-speed operations.

Therefore, it is an object of the present invention to solve the aforementioned problems and to provide a synchronizer for power transmission and a method thereof to simplify the structure of the synchronizer of the manual transmission, to improve assembling efficiency of the synchronizer and to make a progress in changing-speed feeling at the time of a reverse changing-speed operation.

In order to accomplish the aforementioned objects, there is provided a synchronizer of a manual transmission constructed with a clutch hub rotated along with an input shaft, a clutch sleeve assembled for performing rotation with the clutch hub to move toward the input shaft and a synchronizer ring formed for meshing with the clutch sleeve when the clutch sleeve moves to be synchronized with driving gears by friction, the synchronizer comprising:

A synchro-lever formed with an upper portion thereof closely attached to a groove of the clutch sleeve and a lower portion thereof positioned at a lateral surface of the clutch hub when its portion is accommodated into a key slot of the clutch hub, to thereby perform a synchronizing operation with the driving gear by pushing the synchronizer ring positioned at one side thereof when tilted clockwise or counter-clockwise by being caught on the clutch hub in moving toward the input shaft; and an accommodating part formed as a space within the clutch hub, the synchronizer ring and the driving gear for letting the synchro-lever rotate at a predetermined angle to cause a portion thereof to contact with the synchronizer ring.

In addition, there is provided a synchronizing method for the manual transmission, in which a clutch sleeve performing rotations along with an input shaft moves toward the input shaft to synchronize a shynchronizer ring with driving gears, and then the clutch sleeve meshes with the driving gears and the synchronizer ring to convey power, the method comprising a step where a synchro-lever is tilted clockwise or counter-clockwise to push the synchronizer ring closely positioned at the synchro-lever in order to synchronize the driving gears mounted at one side thereof when the clutch sleeve moves to the left or the right.

BRIEF DESCRIPTION OF THE DRAWINGS

FIG. 4b is an enlarged cross-sectional view for illustrating changing-speed operations as a clutch sleeve climbs over a synchro-lever after the changing-speed operation shown in FIG. 4a;

DETAILED DESCRIPTION OF THE PREFERRED EMBODIMENTS

A preferred embodiment of the present invention will be described with reference to accompanying drawings.

Figure 1:
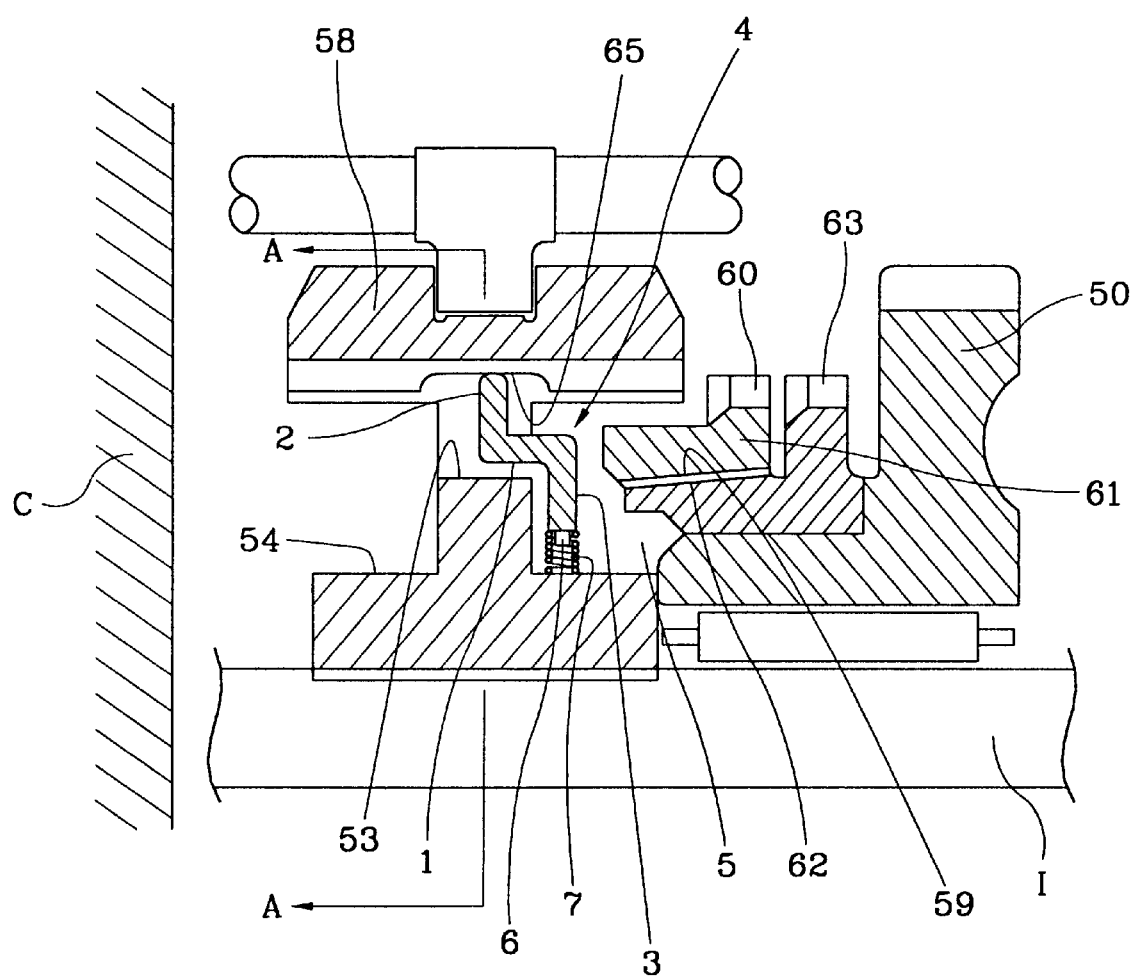
FIG. 1 is an enlarged cross-sectional view for illustrating a backward level and other five levels of synchronizer for a manual transmission of an automobile in accordance with the present invention.
Figure 2:
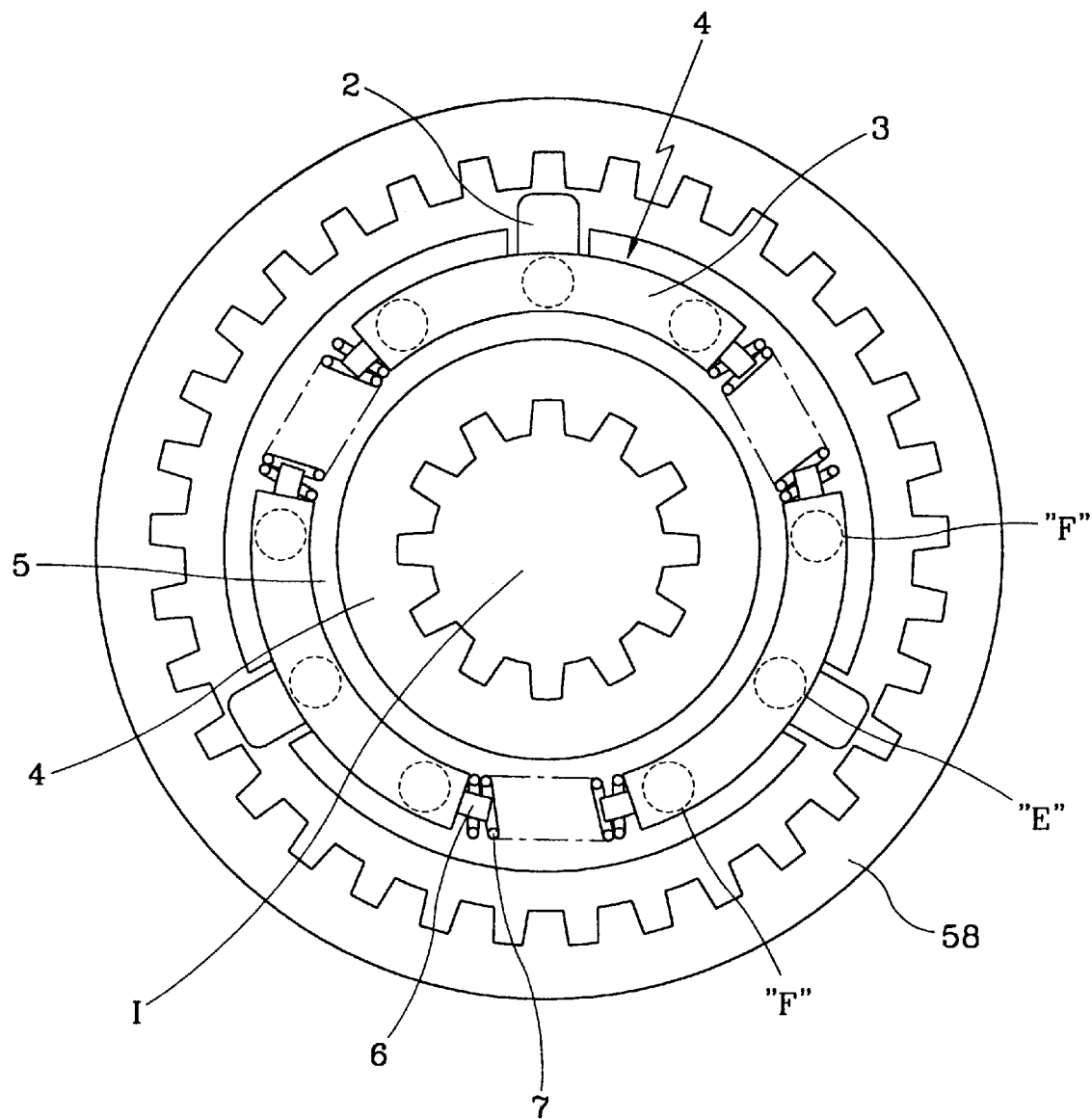
FIG. 2 is a cross-sectional view cut along with a line A—A shown in FIG. 1.
Figure 3:
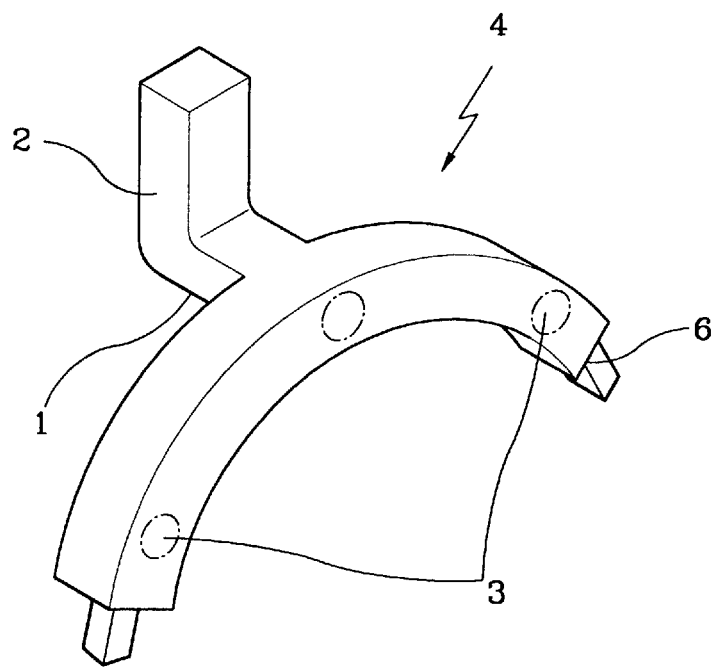
FIG. 3 is a perspective view for illustrating synchro-levers shown in FIG. 1.

FIGS. 1 through to 3 are, respectively, an enlarged cross-sectional view for illustrating reverse and fifth levels of a synchronizer of a manual transmission of the present invention, a cross-sectional view cut along with the A—A line shown in FIG. 1, and a perspective view for illustrating a shynchro-lever shown in FIG. 1. The synchronizer according to the present invention includes a clutch hub 54 for performing rotation along with an input shaft (I), a plurality of synchro-levers having a hitching part 1 formed for being accommodated into a key slot 53 of the clutch hub 54 with being apart from a wall of the key slot 53 and a lever part 2 formed to be perpendicularly extended to an upper direction from the hitching part 1 with its upper portion closely attached at a groove on the lower surface of the clutch sleeve 58 and a two circular leg parts formed to be perpendicularly extended to a lower direction from the hitching part 1 for getting hitched at the clutch hub 54 in movement, elastic means for attaching the lever part 2 to the groove 65 of the clutch sleeve 58 by applying elastic force for a plurality of synchro-levers to be extended, and an accommodating part 5 formed as a space adjacent the clutch hub 54, a synchronizer ring 61 and a driving gear 50 for letting the synchro-lever 4 rotate at a predetermined angle.

Particularly, the synchronizer ring 61 is protruded more toward the clutch hub 54 than the driving gears 50, thereby to be touched the synchro-levers 4 all the time when the synchro-levers 4 rotate clockwise or counter-clockwise. The synchronizer ring 61 and the driving gears 50 are assembled to attach/detach first and second frictional surfaces 59, 62.

The elastic means includes a protruder 6 formed at the lower surface of the leg parts 3 of the synchro-levers 4 and a plurality of springs 7 had a diameter for the protruder 6 to be tightly inserted into therein and positioned between the leg parts 3 of the synchro-levers 4 for applying elasticity to extend the synchro-lever 4.

Even if the springs 7 are not used for an operating engine, the synchro-lever 4 is tightly attached to the clutch sleeve 58 by the centrifugal force according to the rotation of the input shaft I. However, in order to improve operational reliability of the synchro-levers 4 or attach the clutch sleeve 58 to the synchro-levers 4 at a state of the stopped engine, the springs 7 are utilized.

Operational effects of the present invention thus constructed will be described. When a driver decides to change the driving speed of an automobile, for instance, if a shifting lever is manipulated to shift into the fifth level, the clutch sleeve 58 moved with the shifting lever is moved to the right shown in the drawing.

Figure 4A:
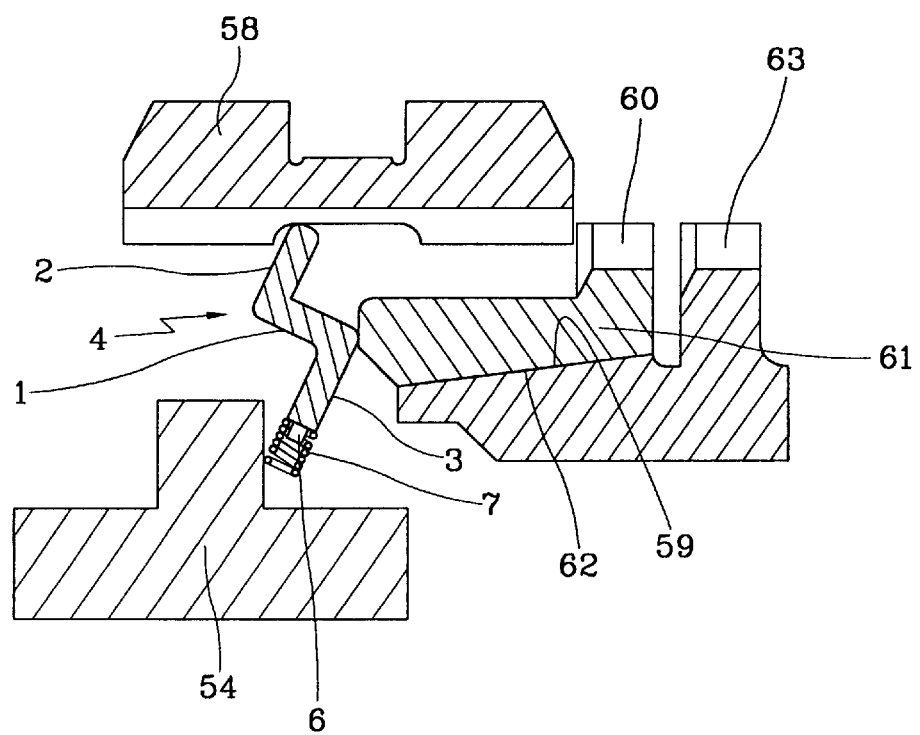
FIG. 4a is an enlarged cross-sectional view for illustrating a fifth level changing-speed operation as a synchro-levers push synchro ring in a synchronizer of the present invention.

If the clutch sleeve 58 is moved to the right in the drawing, the synchro-lever 4 is tilted to the clockwise direction, as shown in FIG. 4a, since the synchro-lever 4 is tightly attached to the clutching sleeve 58 by the centrifugal force of the input shaft and elastic force of the spring 7.

If the synchro-lever 4 is tilted, the part symbolized as "E" is touched to the synchronizer ring 61, which is pushed to the right.

If the synchronizer ring 61 is pushed to the right, the first frictional surface 59 formed at the synchronizer ring 61 is contacted to the second frictional surface 62 extended at the shifting gear 63 of the driving gear 50, thereby a synchronization is accomplished by steps.

If the clutch sleeve 58 and the driving gear 50 are synchronized, the clutch sleeve 58 further moves to the right to be meshed with the synchro-gear 60 of the synchronizer ring 61 and to be simultaneously meshed with the shifting gear 63 of the driving gear 50, thereby completing a changing-speed operation.

Figure 4B:
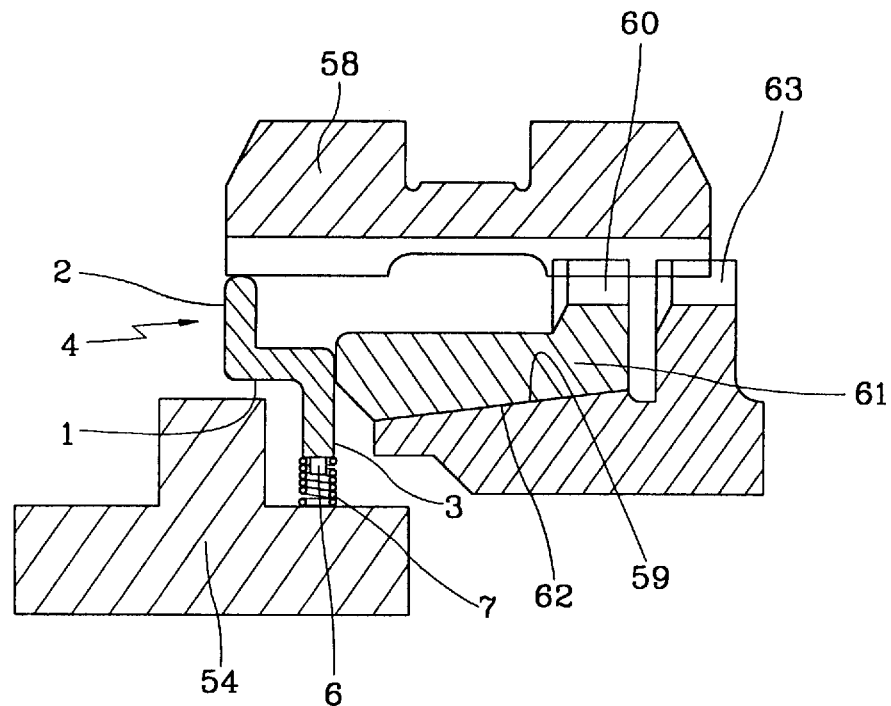

At the point when the changing-speed operation is completed, as shown in FIG. 4b, the synchro-lever 4 is lowered by the clutch sleeve 58 getting away from a groove 65 of the clutch sleeve 58. Then, the synchro-lever 4 gets in an almost upright position, not being in touch with the synchronizer ring 61. As a result, the first and second frictional surfaces 59, 62 gets separated each other.

At this time, while the synchro-lever 4 is tilted, it is kept away from the groove 65. Therefore, the clutch sleeve 58 can smoothly climbs over the synchro-lever 4, thereby improving the changing-speed feeling.

Figure 5:
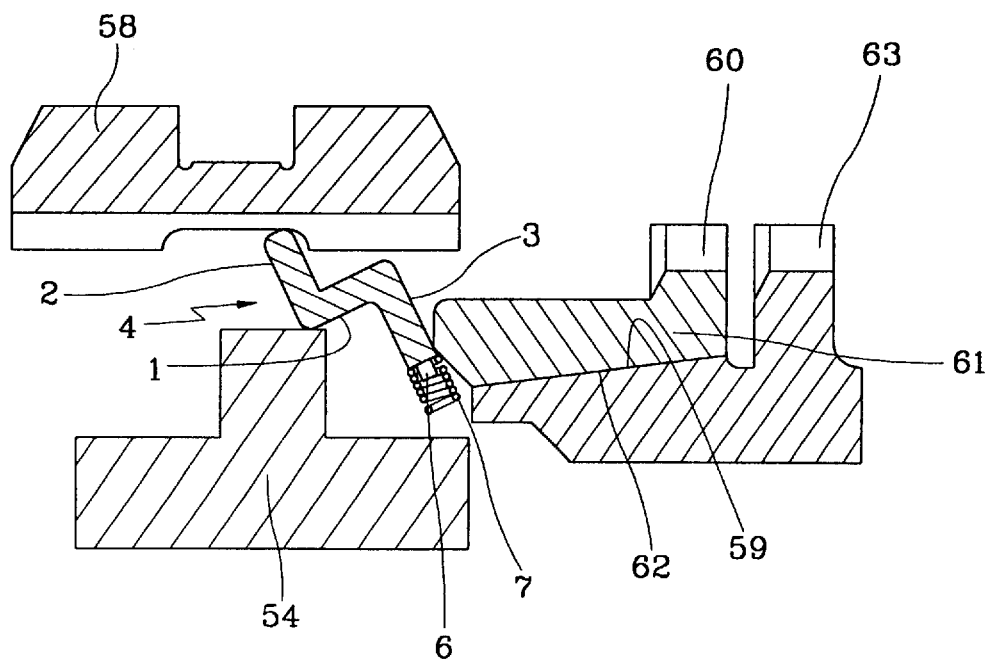
FIG. 5 is an enlarged cross-sectional view for illustrating the reverse changing-speed operation of a synchronizer of the present invention.

Now, the reverse changing-speed operation will be described. As shown in FIG. 5, if the clutch sleeve 58 is moved to the left in the drawing, the synchro-lever 4 being in contact with the clutch sleeve 58 is rotated and tilted to the counter-clockwise direction.

If the synchro-lever 4 is tilted in the counter-clockwise direction, a predetermined portion of the leg part 3 of the synchro-lever 4, symbolized as "F", touches to push the synchronizer ring 61.

The synchronizer ring 61 is pushed to synchronize the first and second frictional surfaces 59, 62. Then, the speed of the driving gear 50, that is, the speed of the input shaft I is reduced and stopped after a predetermined time by braking force generated at the first and second frictional surfaces 59, 62.

Figure 10:
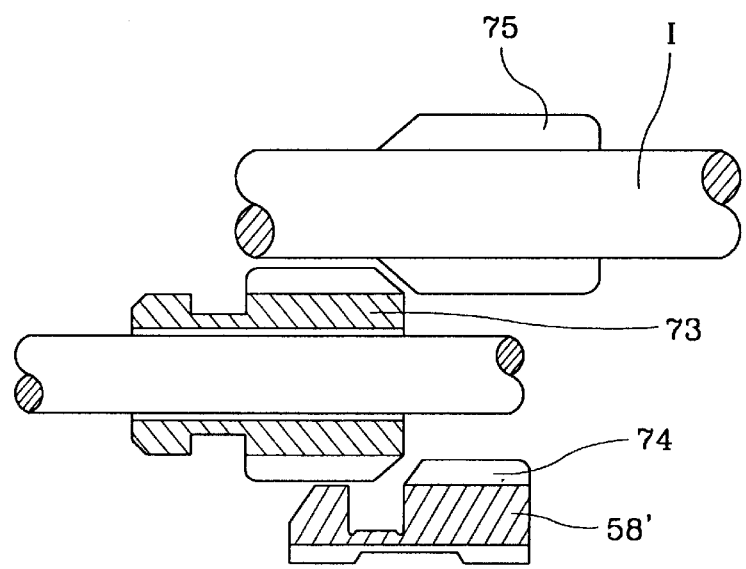
FIG. 10 is a schematic diagram for illustrating a state where the reverse gear, shown in FIG. 8, moves to mesh with a reverse gear tooth and a reverse driving gear formed at a first/second level of a clutch sleeve.

As shown in FIG. 10, as soon as the clutch sleeve 58 moves, the reverse changing-speed lever 72 moves the reverse gear 73 to mesh with the reverse gear tooth 74 formed at the 1/2 clutch sleeve 58' and driving gears 75, thereby completing the reverse changing-speed operation.

Like the conventional method, without assembly of a separate brake ring 68, with braking torque of the first and second frictional surface 59, 62 of the synchronizer ring 61 and the driving gears 50 used for the fifth level changing-speed operation, the input shaft I reduces/stops the rotational speed, performing the reverse changing-speed operation. Therefore, the number of components used for the reverse changing-speed operation are reduced and the structure of the synchronizer gets simplified.

At this time, FIG. 1 illustrates an assembled state of the fifth/reverse driving level synchronizer, which can be also used for the other forward driving synchronizer (first, second, third or fourth driving level synchronizing operations).

Figure 6:
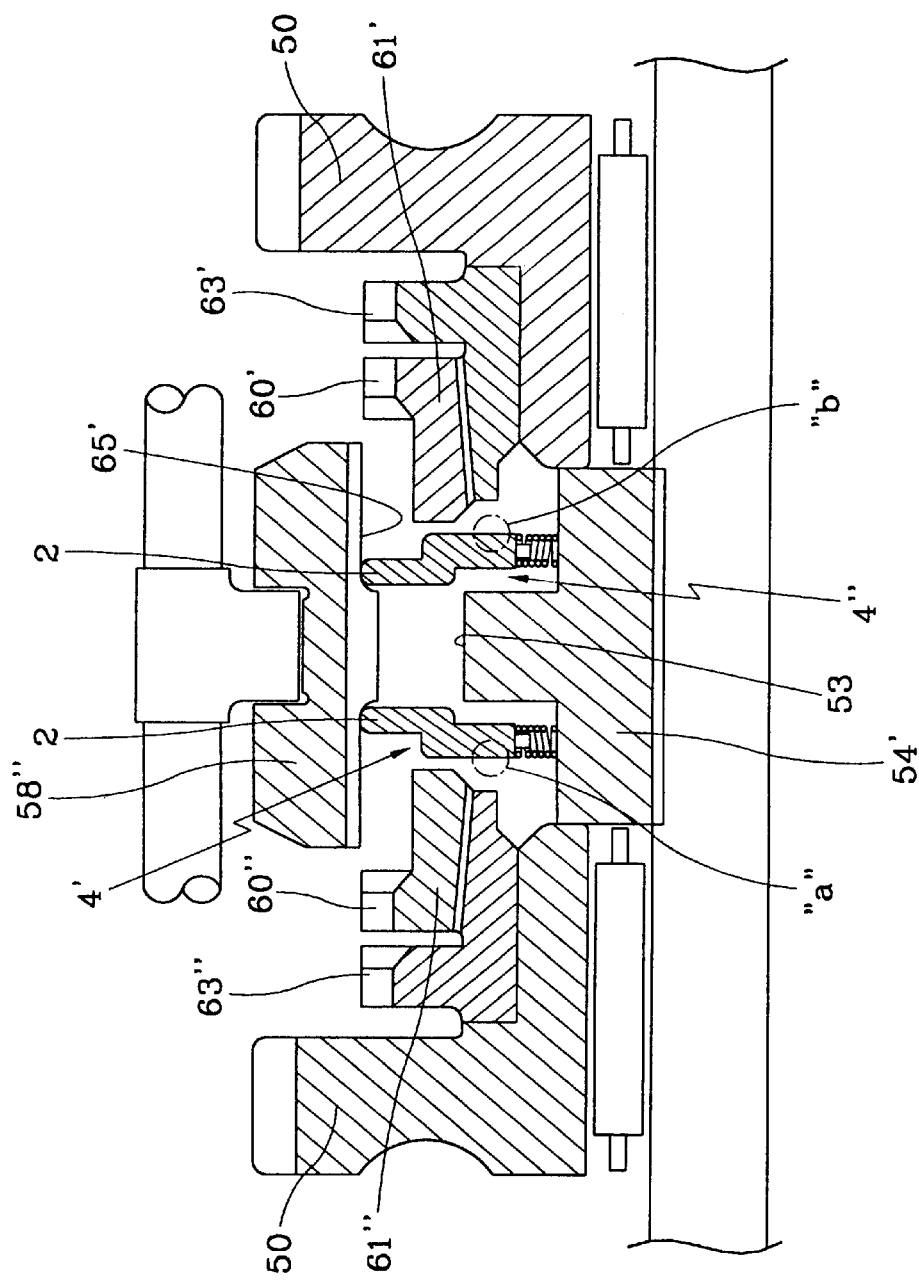
FIG. 6 is an enlarged cross-sectional view for illustrating a state where a synchronizer of the present invention is applied to a forward synchronizer.
Figure 7:
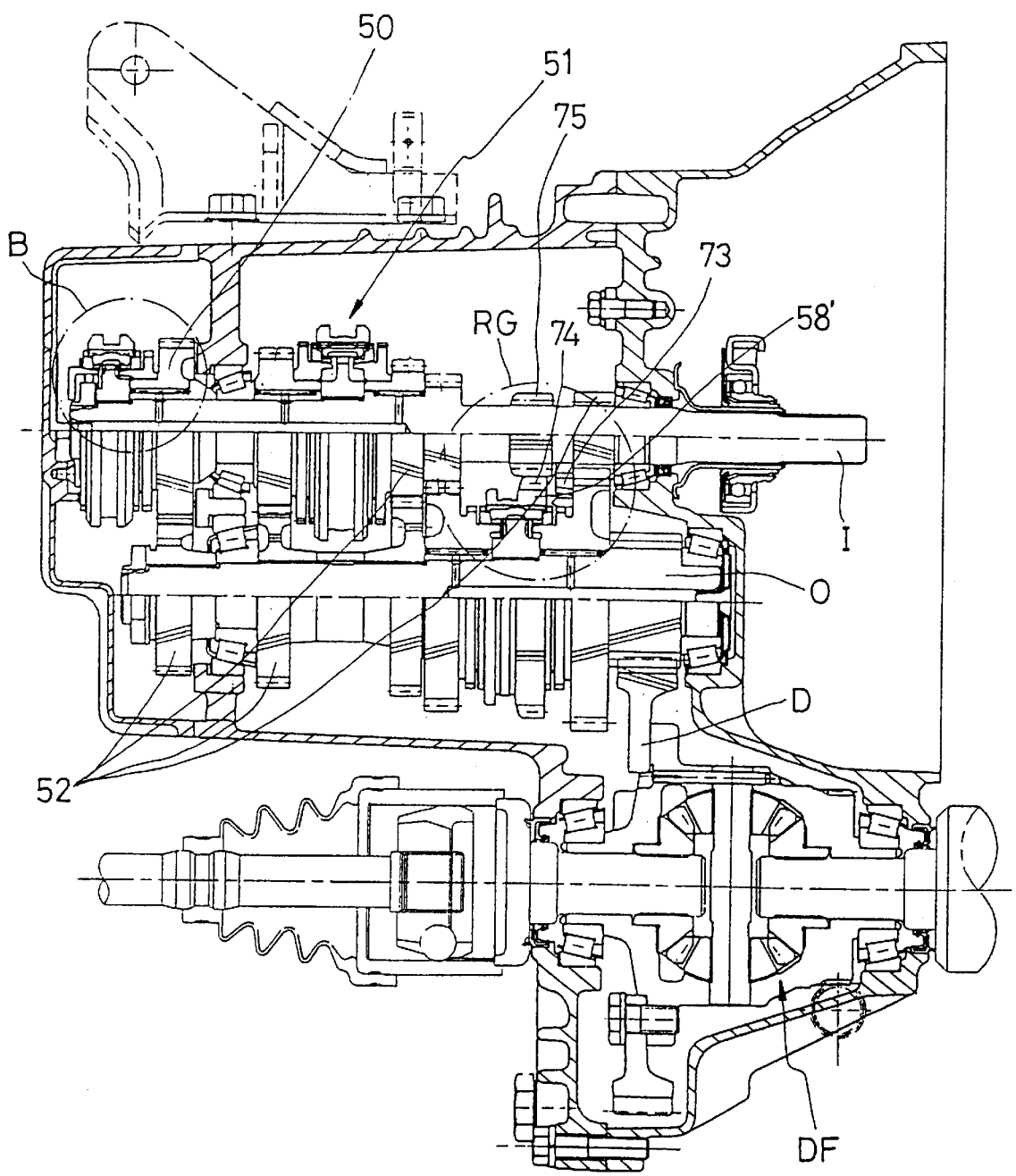
FIG. 7 is a cross-sectional view for illustrating a conventional transmission for an automobile.
Figure 8:
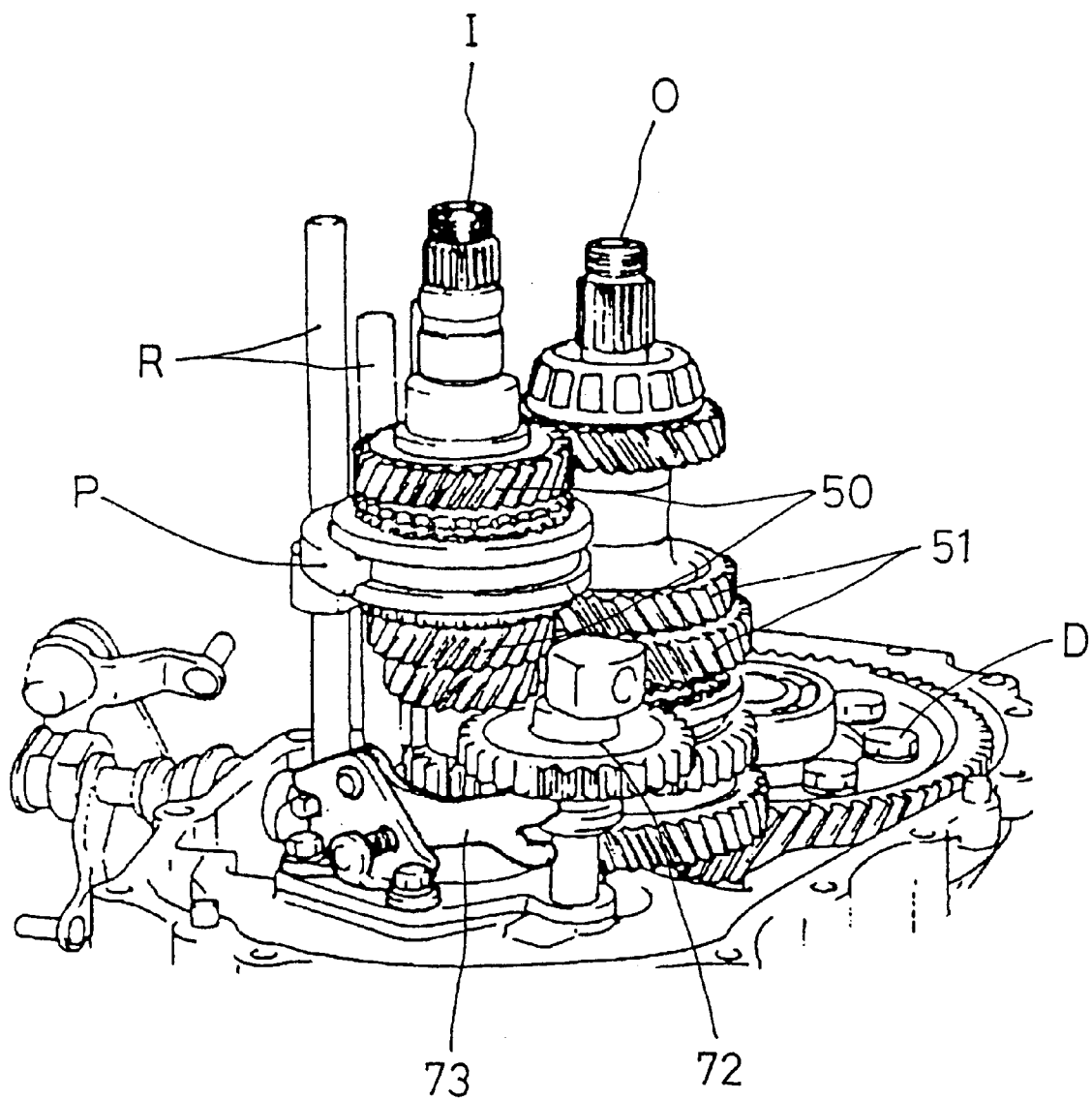
FIG. 8 is a perspective view for illustrating a reverse changing-speed lever and a reverse gear assembled for moving with a reverse cone part the moment a brake ring synchronizes at the reverse cone part shown in FIG. 7.
Figure 9:
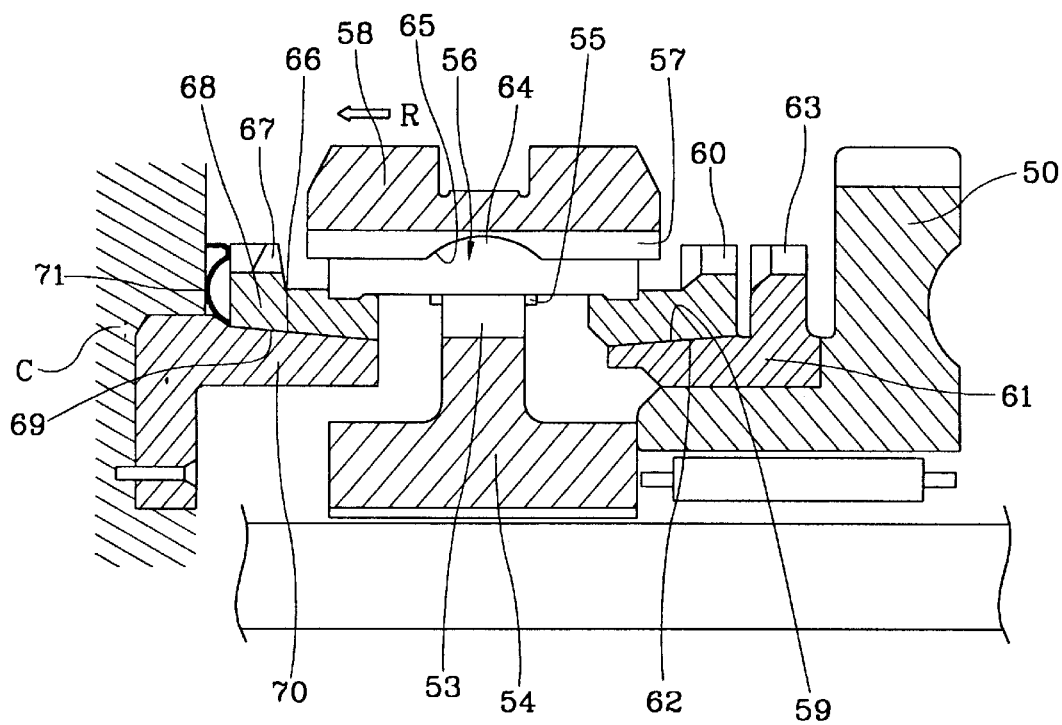
FIG. 9 is an enlarged cross-sectional view for illustrating part B shown in FIG. 7.

In other words, as shown in FIG. 6, if two synchro-levers 4', 4" are accommodated into the key slot 53 of the clutch hub 54' and if the lever part 2 is accommodated into two grooves 65' formed at a lower surface of the clutch sleeve 58", they can be used for the other forward changing-speed level.

A forward changing-speed operation is described in the forward driving state of the automobile. For instance, while the two synchro-levers 4', 4" is accommodated at the groove 65' of the 3th/4th level of the changing-speed clutch sleeve 58", the clutch sleeve 58" is moved to the left (level 3), the synchro-lever 4' is rotated and tilted to the counter-clockwise direction.

At this time, the other synchro-lever 4" is not caught on a projection of the groove 65', thereby not tilted.

If the synchro-levers 4' is tilted, a part "a" of the right synchro-lever 4' gets in contact with the third level synchronizer ring 61".

The third level synchronizer rings 61' contacts the frictional surface of the third level driving gear 50, thereby synchronizing the third synchronizer ring with the driving gear 50.

If the third level synchronizer ring 61" and the driving gear 50 are synchronized, the clutch sleeve 58" meshes with the synchro-gear 60" of the third level synchronizer ring 61" and further meshes with the shifting gear 63 of the third level driving gears 50, thereby completing the changing-speed operation.

When the fourth level changing-speed operation is performed, the synchro-lever 4" is tilted to the clockwise direction to carry out the same operations, thereby completing the fourth level changing-speed operation.

The synchronizer of the present invention is constructed with a plurality of synchro-levers having a lever part to support the clutch sleeve at the bottom surface and the leg parts positioned at the lateral surface of the clutch hub to push the closely positioned synchronizer ring, when the clutch sleeve moves to the left or right, to synchronize with the frictional surfaces of the driving gears. There are advantages in the synchronizer of the manual transmission according to the present invention in that the structure thereof is simplified and the changing-speed feeling thereof is improved.

Particularly, there is another advantage in the synchronizer of the manual transmission of the present invention in that a separate brake ring and other components for reducing or stopping the speed of the input shaft are not needed to thereby simplify the structure of the synchronizer for the reverse changing-speed operation to improve efficiency of assembling tasks.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A synchronizer in combination with a manual transmission constructed with a clutch hub rotated along with an input shaft, and a clutch sleeve assembled for performing rotation with the clutch hub to move toward the input shaft, a synchronizer ring of the synchronizer formed for meshing with the clutch sleeve when the clutch sleeve moves to be synchronized with driving gears by friction, an improvement in the synchronizer comprising:

synchro-levers formed with an upper portion thereof closely attached to a groove of the clutch sleeve and a lower portion thereof positioned at a lateral surface of the clutch hub when a hitching portion thereof is accommodated into a key slot of the clutch hub, to thereby perform a synchronizing operation with driving gears by pushing the synchronizing ring positioned at one side thereof when tilted clockwise or counter-clockwise responsive to being engaged by the clutch hub in moving toward the input shaft; each synchro-lever further including a lever part perpendicularly extended in an upper direction from the hitching portion with its upper portion engaged in a groove on the lower surface of the clutch sleeve and a leg part perpendicularly extended in a lower direction from the hitching portion for engaging the clutch hub during movement thereof; and an accommodating part formed as a space adjacent the clutch hub, the synchronizer ring and the driving gear for letting the synchro-levers rotate at a predetermined angle to bring a portion thereof into contact with the synchronizer ring.

2. The synchronizer, as defined in claim 1, further comprising elastic means for applying elastic force to extend a plurality of synchro-levers, thereby for an upper portion thereof to be closely engaged in the groove of the clutch sleeve.

3. The synchronizer, as defined in claim 2, wherein the elastic means comprises a protruder formed at the bottom surface of the leg parts of the synchro-levers, a plurality of springs having a diameter for the protruder to be inserted therein and positioned between the leg parts of the synchro-levers to apply elastic force to extend the synchro-levers.

4. The synchronizer, as defined in claim 1, wherein the synchronizer ring is protruded more toward the clutch hub than the end of the frictional surface of the shifting gear to improve the reliability of contacting with the synchro-levers.

5. A synchronizer in combination with a manual transmission constructed with a clutch hub rotated along with an input shaft, and a clutch sleeve assembled for performing rotation with the clutch hub to move toward the input shaft, a synchronizer ring of the synchronizer formed for meshing with the clutch sleeve when the clutch sleeve moves to be synchronized with driving gears by friction, an improvement in the synchronizer comprising:

two grooves formed on two side portions of a lower surface of the clutch sleeve;

two synchro-levers accommodated to face each other at a key slot of the clutch hub and formed with an upper lever portion thereof respectively accommodated within the two grooves of the clutch sleeve, each synchro-lever further including a hitching portion accommodated into the key slot of the clutch hub and a lever part perpendicularly extended in an upper direction from the hitching portion with its upper portion engaged in a groove on the lower surface of the clutch sleeve and a leg part perpendicularly extended in a lower direction from the hitching portion for engaging the clutch hub during movement thereof; and an accommodating part formed as a space adjacent the clutch hub, the synchronizer ring and the driving gear for letting the synchro-lever rotate at a predetermined angle to bring a portion thereof into contact with the synchronizer ring.

6. A synchronizer in combination with a manual transmission constructed with a clutch hub rotated along with an input shaft, and a clutch sleeve assembled for performing rotation with the clutch hub to move toward the input shaft, a synchronizer ring of the synchronizer formed for meshing with the clutch sleeve when the clutch sleeve moves to be synchronized with driving gears by friction, an improvement in the synchronizer comprising:

synchro-levers formed with an upper portion thereof closely attached to a groove of the clutch sleeve and a lower portion thereof positioned at a lateral surface of the clutch hub when a hitching portion is accommodated into a key slot of the clutch hub, to thereby perform a synchronizing operation with driving gears by pushing the synchronizing ring positioned at one side thereof when tilted clockwise or counter-clockwise responsive to being engaged by the clutch hub in moving toward the input shaft;

an accommodating part formed as a space adjacent the clutch hub, the synchronizer ring and the driving gear for letting the synchro-levers rotate at a predetermined angle to bring a portion thereof into contact with the synchronizer ring; and elastic means for applying elastic force to extend a plurality of synchro-levers to thereby enable an upper portion thereof to be closely engaged in the groove of the clutch sleeve, the elastic means including;

a protruder formed at the bottom surface of the leg parts of the synchro-levers, a plurality of springs having a diameter of the protruder to be inserted therein, and positioned between the leg parts of the synchro-levers to apply elastic force to extend the synchro-levers.

7. The synchronizer, as defined in claim 6, wherein the synchronizer ring is protruded more toward the clutch hub than the end of the frictional surface of the shifting gear to improve the reliability of contacting with the synchro-levers.

* * * * *